3,766,157
SMOKE-RETARDANT STYRENE POLYMER
COMPOSITIONS
Leo P. Parts, Dayton, and John T. Miller, Jr., West
Carrollton, Ohio, assignors to Monsanto Research Corporation, St. Louis, Mo.
No Drawing. Filed Dec. 29, 1972, Ser. No. 319,964
Int. Cl. C08f 45/62
U.S. Cl. 260—880 R    6 Claims

ABSTRACT OF THE DISCLOSURE

Smoke-retardant polymer compositions comprising a styrene polymer and at least a sufficient amount of an iron, manganese or chromium 8-hydroxyquinolate to reduce smoking.

BACKGROUND OF THE INVENTION (1) Field of the invention

Smoke-retardant polymer compositions.

(2) Description of the prior art

The 8-hydroxyquinolates are among the thermally most stable coordination compounds (R. G. Charles and A. Langer, J. Phys. Chem. 63, 603, 1959). They have been used as structural units in thermally stable polymers.

SUMMARY OF THE INVENTION

Smoke-retardant polymer compositions comprising a styrene polymer and at least a sufficient amount of an iron, manganese or chromium 8-hydroxyquinolate to reduce smoking.

DESCRIPTION OF THE PREFERRED EMBODIMENTS

The 8-hydroxyquinolate derivatives of metals should meet the following major requirements to be most effective as smoke retardants in polymers:

(1) They should be oxidatively and hydrolytically stable under the conditions of normal use of the polymers into which they are incorporated.
(2) They should be thermally stable at the polymer pyrolysis temperature and they should volatilize with the pyrolyzate.
(3) The oxides formed from them in the flame zone should function as catalysts for the oxidation of soot, into which they become incorporated in the flame.

Specifically the 8-hydroxyquinolate metal derivatives that are incorporated into the polymers as smoke oxidation catalyst precursors should meet the following requirements:

(1) Form oxides that are oxidation catalysts for carbon.
(2) Be thermally stable at temperatures that prevail in the condensed phase below the flame zone.
(3) Have sufficiently high vapor pressures to vaporize at temperatures that prevail at the surface of the pyrolyzing polymer (~300 to 500° C.).
(4) Vaporize at a rate that is proportional to the rate of pyrolyzate production.
(5) Be hydrolytically stable.
(6) Have no adverse effects on the physical properties of polymers.
(7) Cause no increase of flammability.
(8) Be effective in fire-retardant-containing polymer systems.
(9) Cause no environmental problems during polymer processing nor with end-use items.

The 8-hydroxyquinolates are effective in styrene polymers such as polystyrene, styrene/acrylonitrile copolymers, styrene/butadiene copolymers, styrene/acrylonitrile/butadiene copolymers and other styrene copolymers.

Styrene/acrylonitrile/butadiene copolymers are defined for the purposes of this application and the claims thereof to include the conventional ABS plastics which are composed of styrene-acrylonitrile copolymers as a continuous phase and a dispersed phase of butadiene-acrylonitrile rubber, or a butadiene-containing rubber onto which styrene-acrylonitrile monomers are grafted. (ABS Plastics, Basdekis, 1964, Preface, by Reinhold Publishing Corporation). The 8-hydroxyquinolates are also effective in structurally modified styrene polymers in which one or more hydrogen atoms of the monomeric units have been replaced by other substituents such as alkyl groups and halogen atoms.

EXPERIMENTAL

Preparation of test materials

Additives were blended with the thermoplastic resins by milling at temperatures dependent upon the volatility of the additive being incorporated (normally 130–160° C.). The blended materials were then molded, by heating under pressure (130–160° C. and 1000–1500 p.s.i.), into ⅛-in. thick specimens. Test samples for smoke determinations were subsequently cut from these specimens.

Smoke mass measurement

Samples, ⅛-in. thick, weighing 0.50 ($\pm$0.01) gram are employed in the smoke mass determinations. The reported measurements were conducted with the Monsanto controlled environment combustion chamber. The sample is ignited with a small hydrogen torch and exposed during combustion to an energy flux of 3.7 watts/cm.$^2$ supplied by the Globar source. Air is drawn through the test chamber at a rate of 8.1 cm./sec. The smoke particles are collected on a fiber glass filter that is mounted in the exit port of the combustion chamber.

The sample, sample holder, and the fiber glass filter are weighed before and after combustion and values for the smoke mass and combustion residue are thus obtained. A minimum of three determinations are conducted with each test material.

The candidate smoke-retardant materials were evaluated by their effect on smoke mass and/or smoke optical density of the polymer compositions into which they were incorporated. The effects of smoke retardants on combustion residue (char) values were determined. With most compositions, the burning times were determined; these are inversely related to the combustion rates. The effects of smoke-retardant additives on the flammability of polymers were also determined.

Smoke optical density measurement *

The standard sample size specified for this test is 2$^{15}$⁄$_{16}$ in. x 2$^{15}$⁄$_{16}$ in. The thickness is dependent upon the material being tested and it is not specified in the test procedure. To conserve experimental test materials, and because of the relatively high smoke optical density values determined for non-smoke-retardant styrene polymers and copolymers, smaller samples (2 in. x 1 in. x ⅛ in.) are often used in our laboratory. The small samples are placed horizontally in the center of the holder, with the lower sample edge directly above the lower rim of the sample holder. The samples are held in place with fine steel wire. The tabulated data indicate sample sizes that were used.

The sample, the aluminum foil backing, and the metal sample holder are weighed before and after burning to obtain values for consumed mass and combustion residue.

\* D. Gross, J. J. Loftus, and A. F. Robertson, ASTM Special Technical Publication 422 (1969).

Duplicate or triplicate determinations are made under both flaming and smoldering conditions. A sample is exposed to an energy flux of 2.5 watts/cm.² from the radiant heater under flaming and smoldering conditions. Flames from a multidirectional propane burner impinge upon the sample and into the trough at the bottom of the sample holder during measurements conducted under flaming conditions.

The sample is exposed until a minimum transmittance value is attained. After the smoke has been flushed from the cabinet, the residual attenuation of the light beam, caused by window deposits, is recorded and a correction is applied to the maximum absorbance value.

Specific optical densities, normalized with respect to unit surface area of the sample ($D_m$), are calculated. The rate of smoke evolution can be determined from transmittance data, recorded as a function of time.

The specific optical densities are defined by the following expressions:

$$D_m \text{ (corr.)} = \frac{V}{A'L} A_{max.} \text{ (corr.)}$$

where
V—test chamber volume
L—optical path length
A′—surface area of the sample $$A_{max.} \text{ (corr.)} = A_{max.} - A_w$$

$A_{max}$ (corr.)—maximum corrected absorbance during the test
$A_{max}$—maximum measured absorbance during the test
$A_w$—absorbance caused by deposits on the windows.

The effectiveness of smoke retardants, on the basis of unit weight of the incorporated additive, diminishes with increasing content.

Results of experiments using 8-hydroxyquinolates as smoke retardants in polymers are shown in Tables I, II and III which follow.

TABLE I.—EFFECT OF 8-HYDROXYQUINOLATE SMOKE RETARDANTS ON SMOKE MASS AND OXYGEN INDEX IN POLYSTYRENE [a]

| Additive | Additive content (wt. percent) [c] | Smoke mass measurements [b] | | | Oxygen index [d] |
|---|---|---|---|---|---|
| | | Smoke (wt. percent) | Combustion residue (wt. percent) | Burning time (min.) | |
| None | | 21.3 | 0.2 | 1.13 | 18.1 |
| Fe(8-hq)₃ | 21.9 | 4.2 | 7.5 | 1.29 | 19.5 |
| Cr(8-hq)₃ | 23.3 | 4.7 | 5.5 | 1.34 | 19.3 |
| Mn(8-hq)₂ | 15.6 | 15.3 | 7.5 | 1.25 | 18.6 |
| Cu(8-hq)₂ | 13.9 | 18.6 | 3.2 | 1.24 | 18.9 |

[a] Lustrex HF 77 marketed by Monsanto Company.
[b] These measurements were made with the Monsanto controlled environment combustion chamber.
[c] Metal content 2.5 wt. percent in all samples that contained additives. The additive contents used in the screening experiments would be too high for most practical applications.
[d] ASTM D-2863-20. Oxygen index is the minimum concentration of oxygen, expressed as percent by volume, in a mixture of oxygen and nitrogen which will just support combustion of a material under conditions of this method.

TABLE II.—EFFECT OF 8-HYDROXYQUINOLATE SMOKE-RETARDANTS ON SMOKE MASS AND OXYGEN INDEX IN ABS [a][b]

| Additive | Additive content (wt. percent) | Smoke mass measurements | | | Oxygen index |
|---|---|---|---|---|---|
| | | Smoke (wt. percent) | Combustion residue (wt. percent) | Burning time (min.) | |
| None | | 16.6 | 1.3 | 1.26 | 18.4 |
| Cr(8-hq)₃ | [c] 23.3 | 2.2 | 8.0 | 1.43 | |
| Fe(8-hq)₃ | [c] 8.7 | 7.6 | 5.3 | 1.83 | 21.4 |
| Fe(8-hq)₃ | [c] 21.9 | 3.7 | 9.0 | 1.68 | 25.1 |

[a] Lustran ABS 640, an acrylonitrile/butadiene/styrene copolymer marketed by Monsanto Company.
[b] See footnote b to Table I.
[c] The 8.7 wt. percent content of Fe(8-hq)₃ corresponds to 1 wt. percent iron. The higher metal hydroxyquinolate contents correspond to the presence of 2.5 wt. percent metal in the smoke-retardant polymer compositions.

An Aminco-NBS smoke density chamber was used to obtain the smoke mass and optical density data for selected compositions, presented in Table III. The values have been corrected for window deposits.

Vapor phase smoke retardants in fire-retardant polymer systems

The effectiveness of vapor phase smoke retardants was explored in bromine-FR-containing polymer systems. With this type of fire retardant, incorporated at high concentrations, the effectiveness of the vapor phase smoke-retardant additives was either somewhat reduced or completely destroyed (see Table IV).

Octabromobiphenyl was used as a thermally stable model fire retardant. Iron-containing smoke retardants, when used in octabromobiphenyl-containing ABS, caused a significant increase in char mass.

TABLE III.—SMOKE MASS AND OPTICAL DENSITY DATA FOR ABS POLYMER COMPOSITIONS THAT CONTAIN 8-HYDROXYQUINOLATE SMOKE RETARDANTS [a][b]

| SR additive(s) | Additive content (wt. percent) | Smoke mass measurements | | Smoke optical density measurements [d] | |
|---|---|---|---|---|---|
| | | Smoke mass (wt. percent) | Burning time [c] (min.) | Combustion residue (wt. percent) flammability | $D_m$ (corr.) flammability |
| None | | 16.6 | 1.26 | 6.2 | 1,297 |
| Fe(8-hq)₃ | 21.9 | 3.7 | 1.86 | 13.9 | 416 |
| Cr(8-hq)₃ | 23.3 | 2.2 | 1.43 | 12.9 | 624 |

[a] Lustran ABS 640 was used for the experiments summarized in this table.
[b] The content of the metal present in volatilizable form (Fe and Cr) was 2.5 wt. percent.
[c] The burning times, which are inversely related to burning rates, were recorded during smoke mass determination experiments.
[d] 1 in. x 2 in. x ⅛ in. specimens used.

TABLE IV.—8-HYDROXYQUINOLATE SMOKE-RETARDANTS IN FIRE-RETARDANT ABS AND STYRENE POLYMER SYSTEMS

| Polymer type | FR additive | | SR additive | | Smoke mass measurements | | | Smoke optical density measurements [a] | | |
|---|---|---|---|---|---|---|---|---|---|---|
| | Formula | Content (wt. percent) | Formula | Content (wt. percent) | Smoke (wt. percent) | Combustion residue (wt. percent) | Burning time (wt. percent) | Combustion residue (wt. percent) | | $D_m$ flammability |
| | | | | | | | | Flammability | Smoldering | |
| Lustran ABS 640. | | | | | 16.6 | 1.3 | 1.26 | 6.2 | 61.9 | 1,297 |
| Do | C₁₂H₂Br₈ | [b]24.4 | | | 20.4 | 8.5 | 1.36 | 25.6 | 68.3 | 2,060 |
| Do | C₁₂H₂Br₈ | [b]24.4 | Fe(8-hq)₃ | 4.4 (0.5% Fe) | 17.1 | 21.8 | 2.14 | | | |
| Do | C₁₂H₂Br₈ | [b]24.4 | Fe(8-hq)₃ | 8.7 (1.0% Fe) | 17.0 | 24.1 | 1.68 | | | |
| Do | C₁₂H₂Br₈ | [b]24.4 | Fe(8-hq)₃ + Fe₂O₃ | 8.7+2.5 | 13.6 | 40.0 | 1.54 | | | |
| Do | C₁₂H₂Br₈ | [b]24.4 | Fe(8-hq)₃ | 21.9 (2.5% Fe) | 14.4 | 32.4 | 1.85 | 55.0 | 84.5 | 1,879 |

[a] 1 in. x 2 in. x ⅛ in. specimens used.
[b] 20 wt. percent bromine.

The incorporation of $Fe_2O_3$, together with $Fe(8-hq)_3$, i.e. ferric 8-hydroxyquinolate, assists in diminishing the adverse effects of the fire retardant on the smoke retardance as indicated in Table IV. Presumably the iron oxide competes for the hydrogen bromide evolved in pyrolysis. Table V contains data on the effect of the ferric 8-hydroxyquinolate on the flammability tests of fire-retardant ABS compositions.

TABLE V.—THE EFFECT OF SMOKE RETARDANTS ON THE FLAMMABILITY OF FIRE-RETARDANT ABS COMPOSITIONS

| Polymer | FR additive | | SR additive | | Flammability test results | | |
|---|---|---|---|---|---|---|---|
| | Formula | Content (wt. percent) | Formula | Content (wt. percent) | OI | UL-94 test, avg. burning time (sec.) | Flammability rating [a] |
| Lustran ABS 640 | | | | | 18.1 | >25 | NSE |
| Do | $C_{12}H_2Br_8$ | [b] 24.4 | | | 24.1 | 1.3 | SE-O |
| Do | $C_{12}H_2Br_8$ | [b] 24.4 | $Fe(8-hq)_3$ | 8.7 (1% Fe) | 35.6 | 2.7 | SE-O |
| Do | $C_{12}H_2Br_8$ | [b] 24.4 | $Fe(8-hq)_3$ | 21.9 (2.5% Fe) | 37.1 | 1.4 | SE-O |

[a] NSE designates polymer compositions that are not self-extinguishing. SE-O indicates self-extinguishing polymers which do not release any flaming particles and which do not continue to flame longer than 5 sec. average of six flame applications (maximum not more than 10 sec.). See Modern Plastics, October 1970, page 96.

[b] 20 wt. percent bromine, octabromobiphenyl.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. For example, glass-forming additives such as $Mg(OH)_2 + (NH_4PO_3)_n$, can be added to the polymers in sufficient amounts to reduce smoking due to smoldering combustion, and these additives are in addition to the 8-hydroxyquinolate to reduce smoking due to flaming combustion. Of the order to about 10% by weight each of $Mg(OH)_2$ and $$(NH_4PO_3)_n$$

based on the polymer will normally be sufficient to substantially reduce smoking due to smoldering combustion. Accordingly, modifications are contemplated which can be made without departing from the spirit of the described invention.

What is claimed is:

1. A smoke retardant polymer composition comprising a styrene polymer and at least a sufficient amount of an 8-hydroxyquinolate of a metal selected from the class consisting of iron, manganese and chromium to reduce smoking.

2. A composition of claim 1 wherein said polymer is polystyrene.

3. A composition of claim 1 wherein said polymer is an acrylonitrile/butadiene/styrene copolymer.

4. A composition of claim 1 containing a bromine-containing fire retardant.

5. A composition of claim 4 wherein said polymer is an acrylonitrile/butadiene/styrene copolymer.

6. A composition of claim 5 wherein said fire retardant is octabromobiphenyl.

References Cited

UNITED STATES PATENTS 3,418,267  12/1968  Busse _____ 260—45.75
3,560,441  2/1971   Schwarcz _____ 260—45.75
3,697,456  10/1972  Pitts _____ 260—45.75

OTHER REFERENCES

SPE Journal, vol. 28, October 1972; article "How Plastics Smoke," pp. 43–49.

DONALD E. CZAJA, Primary Examiner

V. P. HOKE, Assistant Examiner

U.S. Cl. X.R.

260—45.7 R, 45.75 R, 45.9